United States Patent Office

3,400,174
Patented Sept. 3, 1968

3,400,174
FLAME RESISTANT UNSATURATED POLYESTER RESINS CONTAINING A VINYL ETHER OF A BROMINATED PHENOL
Klaus Heidel and Anton Schick, Marl, Herbert Jenkner, Cologne-Deutz, and Hans-Eberhard Praetzel, Bensberg-Frankenfort, Germany, assignors to Chemische Werke Hüls Aktiengesellschaft, Marl, Germany, a corporation of Germany
No Drawing. Filed Aug. 8, 1966, Ser. No. 570,775
Claims priority, application Germany, Sept. 3, 1965, C 36,804
3 Claims. (Cl. 260—869)

ABSTRACT OF THE DISCLOSURE

Flame retardant polyesters are prepared by polymerizing an unsaturated polyester in the presence of a copolymerizable vinyl ether of a brominated univalent phenol having from 2 to 5 bromine atoms per phenyl group.

---

It is known to prepare flame-resistant unsaturated polyester resin by co-condensation therewith of halogen-containing carboxylic acids or hydroxy compounds. Examples of halogen-containing dicarboxylic acids that have been used are hexachloroendomethylenetetrahydrophthalic acid, tetrachlorophthalic acid, dibromoisophthalic acid and 4,5-dibromohexahydrophthalic acid and examples of halogen-containing monocarboxylic acids are 3,5-dibromobenzoic acid and trichloroacrylic acid and examples of halogen-containing hydroxyl compounds are diols such as glycerine - mono - pentachlorophenylether, octochlorodiphenyleneoxy-dialkanols, 2,2 - isopropylidene-bis-(2,6 - dichloro-p-phenyleneoxy-dialkanols), 2,2 - isopropylidene-bis-(2,3,5,6-tetrachloro - p - phenyleneoxy-diethanol) and diols containing halogenmethyl groups such as pentaerythritol-dichlorohydrin.

When this method of co-esterification of the halogen-containing component is employed, there is a tendency to decompose during the course of polycondensation, causing very pronounced discolorations of the polyester even if the compounds are used in very pure state and even if very special esterification conditions are maintained.

There is further the disadvantage that it becomes necessary to produce and store very specific resins which will meet the requirements for flame-resistant properties.

It is much simpler to obtain flame-resistant polyester resins by the subsequent admixture of a flame-proofing agent with standard resins which are not flame-proof. It is known for example to admix with polyester resins, chlorinated hydrocarbons such as chloroparaffins or Diels-Alder adducts of the hexachlorocyclopentadiene, together with or without antimony trioxide. Articles produced from such polyesters have only a limited use because they lack transparency due to the presence of the antimony trioxide. Also known is the admixture of soluble organic antimony, silicon, boron and phosphorus compounds which may contain halogens.

These compounds have the disadvantage that they are not incorporated into the molecular bond during the hardening but are incorporated in the molded article like a plasticizer so that the mechanical properties are affected adversely. Furthermore, the flame-proofing agent may diffuse from the molded article to the surface and be washed off thus lowering the flame resistance.

Also, there have been added halogen-containing polymerizable monomers which are incorporated ito the molecular bond during the hardening. The admixture of mono- or dichlorostyrene is described in German Patent No. 1,103,021. However, such polyester resin mixtures are not sufficiently stable to be stored and the halogen content of the resins so prepared is too low to insure proper flame resistance. The admixture of other halogen-containing monomers such as the diallylester of tetrachlorophthalic acid or of the HET-acid (French Patent No. 945,984, British Patent No. 595,758 and French Patent No. 896,-826) results in undesirable slow hardening at room or slightly higher temperatures.

A more advantageous hardening at room temperature, compared with the use of the above discussed allylesters, is attained by the use of acrylic acid-pentachlorophenyl-ester (British Patent No. 550,189). This process has the disadvantage however that the flame resistant polyester resins so prepared will have a strong odor of chlorinated phenol after hardening, especially if traces of water cause hydrolysis.

It is also known (French Patent No. 1,222,138) to prepare flame resistant molded articles by hardening mixtures of unsaturated polyester resins and 2,4,6-tribromophenyl-allylether. However, such mixtures will not harden thoroughly, especially at room temperature, and will result in molded articles with undesirable mechanical properties.

It has been found that it is possible to prepare flame resistant molded articles and coatings by hardening molded masses containing unsaturatedf polyesters, copolymerizable bromophenylethers, catalysts and, if desired, accelerators provided that a vinylether of a brominated monovalent phenol is used as the copolymerizable bromophenylether, possibly together with other polymerizable compounds, and provided that the number of bromine atoms per phenyl radical ranges from 2 to 5.

Examples of such compounds are dibromophenylvinyl-ethers, such as the 2,6- and 2,4-dibromophenylvinylether, tribromophenylvinylethers, such as the 2,4,6-tribromo-phenvlvinylether, tetrabromophenylvinylethers such as the 2,3,4,5-tetrabromophenylvinylether and 2,3,5,6-tetrabromophenyvinylether and pentabromophenylvinylethers.

These ethers can be prepared in simple manner by the reaction of brominated phenols with acetylene.

The unsaturated polyesters are prepared in usual manner by the condensation of $\alpha,\beta$-unsaturated dicarboxylic acids, especially fumaric or maleic acid with polyhydric, preferably dihydric alcohols such as ethyleneglycol, diethyleneglycol, propanediol-(1,3), butanediols and cyclohexanedimethanol. A part of the unsaturated dicarboxylic acids can be substituted by any saturated dicarboxylic acid normally used for the preparation of unsaturated polyester resins such as succinic, adipic, phthalic, tetrahydrophthalic, endomethylene tetrahydrophthalic and isophthalic acid and their anhydrides. By the additional employment of mono-, tri- or multivalent carboxylic acids, or alcohols respectively, the polyester resins can be modified still further.

In accordance with the invention these known unsaturated polyester resins are mixed with the polymerizable vinylethers of at least doubly brominated phenols and hardened, possibly in the presence of other polymerizable monomers. Usually these mixtures contain 40 to 85 and preferably 50 to 70 percent by weight of unsaturated polyester resin and 15 to 60, preferably 30 to 50 percent by weight of polymerizable monomers. The proportion of the vinylethers of the brominated phenols to the polymerizable monomers is 10 to 100, preferably 25 to 75 percent by weight so that the bromine content of the molded articles will be 3 to 25, preferably 5 to 20, and especially 10 to 15 percent by weight. As a rule, it is advantageous to employ, in addition to the vinyl-ethers of the brominated phenols, polymerizable monomers either in solid or liquid state such as styrene, vinyl-acetate, methacrylic acid ester or diallylphthalate. The novel polymerizable mixtures which contain vinylethers of brominated phenols can be hardened in usual manner with the aid of polymerization catalysts such as organic peroxides or azo compounds. Suitable are for example benzoylperoxide, cyclohexanoneperoxide, methylethylketoneperoxide, cumenehydroperoxide or azo-bis-isobutyric-acid nitrile, and their effects can be increased by accelerators such as cobalt acetate or naphthenate, tertiary aromatic amines or vanadium salts. The hardening can be accomplished at room temperature or at higher temperatures up to approximately 160° C., depending on the composition of the initiator system. The flame resistance can be further improved by the admixture of phosphorus compounds to the polyester resins, for example tributylphosphate, triallylphosphate or alkenylphosphonic acid ester. The vinylethers of the brominated phenols used in accordance with the invention are well compatible with the unsaturated polyester resins. Furthermore, their employment increases the solubility within the unsaturated polyester resin of any additionally used monomers, such as styrene, because the vinylethers of the brominated phenols act as solubilizers.

The polymerizable mixtures of the invention can be stored over extended periods of time at room or slightly higher temperatures without the danger of premature polymerization. They harden faultlessly at room or higher temperatures so that molded articles with desirable mechanical properties are obtained. The polyester resins prepared according to the invention are outstandingly flame resistant, have no odor, have excellent transparency and are practically colorless.

The polymerizable mixtures can be utilized for the manufacture of coatings, fiber glass reinforced laminates as well as molded articles, especially for the building trade.

EXAMPLES 1160 g. of fumaric acid, 1480 g. of phthalic acid anhydride, 1630 g. of 1,2-propyleneglycol and 750 mg. of hydroquinone were heated to 150 to 180° C. in a stirrer vessel with descending condenser and under nitrogen until the acid number of the polyester dropped to 35.

The following mixtures and the resulting polyester were prepared:

I. 110.6 g. of polyester, 59.4 g. of styrene and 30 g. of 2,4,6-tribromophenylvinyl ether;
II. 110.6 g. of polyester, 59.4 g. of styrene, 30 g. of 2,4,6-tribromophenylvinylether and 8 g. of triallylphosphate;
III. 100.8 g. of polyester, 54.2 g. of styrene and 45 g. of 2,4,6-tribromophenylvinyl ether;
IV. 100.8 g. of polyester, 54.2 g. of styrene, 45 g. of 2,4,6-tribromophenylvinylether and 8 g. of triallylphosphate.

EXAMPLES FOR COMPARISON

V. 109.2 g. of polyester, 58.8 g. of styrene and 32 g. of 2,4,6-tribromophenylallyl ether;
VI. 109.2 g. of polyester, 58.8 g. of styrene, 32 g. of 2,4,6-tribromophenylallylether and 8 g. of triallylphosphate;
VII. 98 g. of polyester, 54 g. of styrene and 48 g. of 2,4,6-tribromophenylallylether;
VIII. 98 g. of polyester, 54 g. of styrene, 48 g. of 2,4,6-tribromophenylallyl ether and 8 g. of triallylphosphate;
IX. 110 g. of polyester, 60 g. of styrene, 30 g. of chloroparaffin (chlorine content 70%) and 15 g. of antimony trioxide.

Every mixture listed above was mixed thoroughly with a 10% cobaltnaphthenate solution (in styrene) and then divided into two parts of 100 g. each.

Determination of the gelling and hardening times as well as measurements of the maximum temperatures during the hardening.—3 ml. of a cyclyhexanoneperoxide solution (50% in phthalate plasticizer) were admixed with each 100 g. of the resin solutions. With the aid of a thermocouple the gelling or processing periods, that is the period from the admixture of the peroxide to the beginning of the rise in temperature, was measured at room temperature (22° C.), as well as the hardening times, that is the time from the beginning of the rise in temperature to the maximum temperature.

Determination of the flame resistance.—The remaining 100-gram portions of the resin solutions were mixed with 3 ml. of a cyclohexaneperoxide solution and were then used to impregnate three glass fiber mats which were stacked and rolled between cellophane sheets into a plate of approximately 3 mm. thickness. The plates were hardened for one hour at room temperature, then rehardened for two hours at 80° C. and cut into strips of 2 cm. width. The strips were inserted for 30 seconds at an angle of 45° into a nonluminous flame of a Bunsen burner with an inner cone of approximately 4 cm. height in such manner that the strip touched the inner cone. The times needed for the fire to become extinct after withdrawal of the strips from the flame of the burner were measured.

The following values were obtained:

TABLE 1

| Mixtures | Contents of the resin solution, percent | | Hardening of the resin solutions | | | Extinction time of test bodies with fiberglass mats, seconds |
|---|---|---|---|---|---|---|
| | Bromine | Phosphorus | Gel time, min. | Hard time, min. | Max. temp., °C. | |
| I | 10.1 | | 8 | 17 | 149 | 15 |
| II | 9.7 | .55 | 10 | 23 | 146 | 3 |
| III | 15.1 | | 7 | 20 | 133 | (¹) |
| IV | 14.5 | .55 | 9 | 24 | 132 | (¹) |
| V | 10.4 | | 8 | 19 | 109 | 18 |
| VI | 10.0 | .55 | 9 | 22 | 103 | 5 |
| VII | 15.5 | | 7 | 21 | 93 | (¹) |
| VIII | 15.0 | .55 | 8 | 28 | 82 | (¹) |
| IX | Chlorine content, 9.8 | | 8 | 18 | 150 | (¹) |

¹ Immediately.

The hardening of mixtures I to IV (admixture of 2,4,6-tribromophenylvinyl ether to the polyester resin) at room temperature for the determination of the gelling and hardening periods, gave well and thoroughly hardened molded articles.

In contrast thereto, the hardening of the mixtures V to VIII (controls with the use of 2,4,6-tribromophenylallyl ether) at room temperature gave molded articles of unsatisfactory hardness and very tacky surfaces. These disadvantages were indicated by the maximum temperatures reached during the hardening process, temperatures which are low in comparison with the temperatures occurring during the processing of the examples according to the invention, because the heat effect during the hardening is an indication of the completeness and thoroughness of the hardening.

The comparative Example IX resulted in molded articles which, although sufficiently flame resistant and well hardened, were milky white and non-transparent.

The advantages of the employment of brominated phenylvinyl ethers over the brominated phenylallyl ethers became especially apparent by the comparison of the mechanical values of test bodies obtained in each case by the hardening of 100 g. of the mixtures II, VI and IX after admixture of .65 ml. of a 10% cobaltnaphthenate solution and 2 ml. of a 40% methylethylketone peroxide solution and a two hour rehardening of the test bodies at 80° C.

TABLE 2

|  | Mixture | | |
| --- | --- | --- | --- |
|  | II | VI | IX |
| Flexural strength (kg./cm.$^2$) | 910 | 482 | 700 |
| Deflection (mm.) | 9.2 | 8.6 | 4.5 |
| Impact resistance (cm. kg./cm.$^2$) | 6.5 | 5.2 | 5 |
| Ball pressure hardness (kg./cm.$^2$) after 10″ | 1,600 | 863 | 1,000 |
| Martens value (° C.) | 45 | (¹) | 50 |

¹ Could not be measured, too soft.

We claim:
1. A composition consisting essentially of an unsaturated polyester and a co-polymerizable vinylether of a brominated univalent phenol having from 2 to 5 bromine atoms per phenyl group.
2. A composition as defined in claim 1 in which the mixture contains another polymerizable monomer and in which the mixture contains 40 to 85% by weight of the polyester and from 60 to 15% by weight of polymerizable monomer and the ratio of the vinylether to the total of polymerizable monomers is from 10 to 100% by weight, the amount of bromine in the mixture being from 3 to 25% by weight.
3. A product formed by hardening a composition defined in claim 1 at a temperature from room temperature to 160° C. in the presence of a polymerization catalyst.

References Cited
UNITED STATES PATENTS

| 3,090,814 | 5/1963 | Foster et al. | 260—612 |
| 3,270,089 | 8/1966 | Wygant et al. | 260—869 |

FOREIGN PATENTS

| 550,189 | 2/1953 | Great Britain. |
| 1,222,138 | 3/1954 | France. |

MURRAY TILLMAN, *Primary Examiner.*

J. T. GOOLKASIAN, *Assistant Examiner.*